United States Patent [19]

Myles

[11] 3,818,612

[45] June 25, 1974

[54] VISUAL SYSTEM FOR ROTARY-WING AIRCRAFT

[75] Inventor: Walter E. Myles, Alexandria, Va.

[73] Assignee: The Singer Company, New York, N.Y.

[22] Filed: Jan. 26, 1972

[21] Appl. No.: 220,773

Related U.S. Application Data

[63] Continuation of Ser. No. 885,714, Dec. 17, 1969, abandoned.

[52] U.S. Cl. .................................. 35/12 N, 35/12 K
[51] Int. Cl. ................................................ G09b 7/08
[58] Field of Search....... 35/12 K, 12 L, 12 N, 12 P, 35/11, 10.2, 46, 42.5; 240/1 EL; 353/11, 12

[56] References Cited
UNITED STATES PATENTS

| | | | |
|---|---|---|---|
| 2,046,202 | 6/1936 | Miles | 35/11 |
| 2,307,840 | 1/1943 | MacDonald | 35/12 N |
| 2,474,096 | 6/1949 | Dehmel | 35/12 N |
| 2,579,177 | 12/1951 | Miles | 35/11 |
| 2,961,778 | 11/1960 | De Florez et al. | 35/12 K |
| 3,012,337 | 12/1961 | Spencer, Jr. et al. | 35/12 N |
| 3,060,598 | 10/1962 | Gilbert et al. | 35/12 L |
| 3,283,418 | 11/1966 | Brewer et al. | 35/11 |
| 3,405,462 | 10/1968 | Belva et al. | 35/46 R |
| 3,439,157 | 4/1969 | Myles | 240/1 EL |
| 3,531,876 | 10/1970 | Phillips | 35/12 L |
| 3,534,486 | 10/1970 | Frasca et al. | 35/12 L |

Primary Examiner—Wm. H. Grieb
Attorney, Agent, or Firm—William Grobman; James C. Kesterson

[57] ABSTRACT

This invention provides a visual system which will satisfy the requirements of rotary-wing aircraft simulation. In rotary-wing aircraft simulation, the vertical ascent of the aircraft provides a visual environment which is different from that of fixed-wing aircraft. This visual system provides a platform which is preferably provided with freedom of movement in six degrees and on which are mounted small scale models of vertical structures such as trees, hills, buildings, and the like. A point light source provides back illumination with the silhouettes of the models projected onto the back of a rear projection screen. The eye of the observer is at the ground level horizon, and the platform is supported to move vertically to simulate the ascent and descent of the aircraft, and to move about the horizon line to provide visual simulation of the aircraft movements.

9 Claims, 2 Drawing Figures

PATENTED JUN25 1974 3,818,612

INVENTOR.
WALTER E. MYLES
BY
William Grolman

VISUAL SYSTEM FOR ROTARY-WING AIRCRAFT

RELATED APPLICATIONS

This specification is a continuation of the copending patent application Ser. No. 885,714, filed on Dec. 17, 1969, in the name of Walter E. Myles for VISUAL SYSTEM FOR ROTARY WING AIRCRAFT, now abandoned.

BACKGROUND OF THE INVENTION

1. Field of the Invention

This invention relates to optical systems and more particularly to visual systems used in simulation equipment.

2. Description of the Prior Art

Visual simulation has been the most difficult form of simulation to achieve good and believable results in the past. It is far easier to drive instruments accurately or to move a vehicle cockpit realistically than to provide with accuracy the large number of visual stimuli normally received by a person. One attempt to accomplish this is shown in U.S. Pat. No. 2,046,202, issued on June 30, 1936, to G. H. Miles for OPTICAL PROJECTION APPARATUS. As a result, visual systems for large scale simulators such as those which are used to train aircraft pilots and the like are large, cumbersome and expensive, and they do not really provide the accurate duplication of the environment which is desired. However, many visual simulators have been developed for fixed-wing aircraft. In simulation of fixed-wing aircraft, the takeoff and landing exercises are the ones which require the most training, and most visual systems include means for displaying airport or aircraft carrier runways on approach and takeoff. Since a rotary-wing aircraft takes off and lands vertically, it does not require a runway on either land or a carrier, and the previous aircraft visual systems are not applicable. In fact, the primary takeoff and landing training for rotary-wing aircraft requires a visual system which displays normal terrain features such as trees, rocks, ravines, and the like. This invention provides such a visual system which is also simple, inexpensive, and realistic in perspective. In this respect, the apparatus of this invention is contrasted with that of Pat. No. 2,046,202 which is designed to train persons who do not move vertically. The system of the patent does not include basic requirements for vertical takeoffs and landings such as a reference horizon.

It is an object of this invention to provide a new and improved visual system.

It is another object of this invention to provide a new and improved visual system for simulation equipment.

It is a further object of this invention to provide a new and improved visual system for simulating a portion of the environment encountered by aircraft.

It is still another object of this invention to provide a new and improved visual system for use in equipment which simulates rotary-wing aircraft.

Other objects and advantages of this invention will become apparent as the following description proceeds, which description should be considered together with the accompanying drawings in which.

Figure 1:
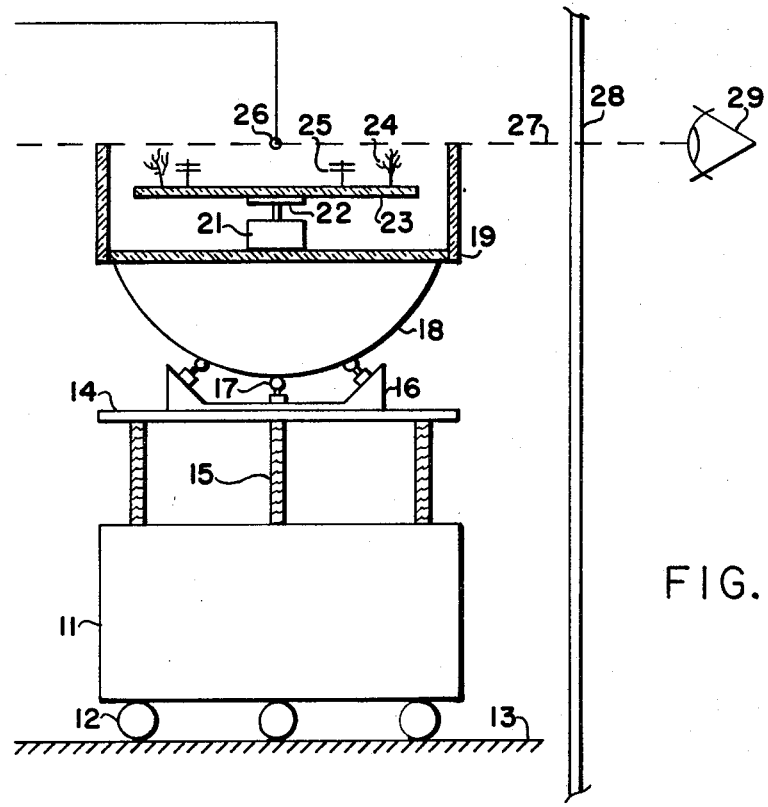
FIG. 1 is an elevational view of the apparatus according to this invention.

Referring to the drawings in detail, the reference character 11 designates a base which is supported on wheels 12 for movement over a floor or other flat surface 13. The base 11 carries a plurality of lead screws 15, or equivalent devices such as pneumatic or hydraulic cylinders, scissors, etc. A platform 14 is supported upon the lead screws 15 and carries a support 16. The support 16 has mounted on it a plurality of wheels 17 which, in turn, movably support a hemisphere 18. On top of the hemisphere 18 is a cylinder 19 formed of a suitable transparent construction material such as glass or an acrylic resin. A motor 21 carries a bearing plate 22 for supporting a transparent disk 23. Mounted on the top surface of the disk 23 are models of various terrain features such as trees 24, and utility poles 25. Suspended above the center of the disk 23 and on a horizon line 27 formed by the top edge of the cylinder 19 is a point light source 26 carried by any suitable support means. An observer 29 looks along the horizon line 27 at a rear projection screen 28.

Figure 2:
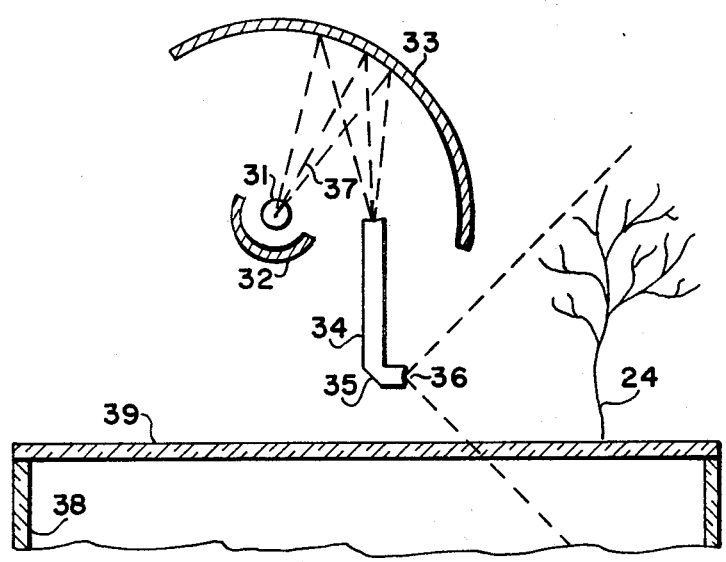
FIG. 2 is an elevational view of a portion of the apparatus of FIG. 1.

In operation, the base 11 contains drive equipment, not shown, for driving the wheels 12 to move the base over the surface 13 in any desirable manner. Electrically controlled equipment is old, and any equipment suitable for the purpose may be used. In addition, the base 11 contains means for driving the lead screws 15 to raise and lower the platform 14. This means may be, for example, a single motor connected by suitable gearing to cause a plurality of threaded female members to rotate and thus raise or lower the lead screws 15. As mentioned above, other vertical movement equipment such as hydraulic or pneumatic cylinders, scissors, and similar devices may be substituted for the lead screws 15. In any case, the several devices 15 must be synchronized to raise or lower the platform 14 while maintaining it level. The support 16 is so shaped as to readily carry the hemisphere 18, and contained in any suitable portion of the support 16 is drive means for driving the wheels 17 in any desired direction. This support may be of the type disclosed in U.S. Pat. No. 3,405,462 to Belva et al., issued on Oct. 15, 1968, and entitled Display Device. The hemisphere 18 is then caused to move to any desired position in accordance with the principles set forth in the above mentioned patent. Light from the point light source 26, the details of which are shown in FIG. 2, is directed across the models of the terrain features such as the trees 24 and the utility poles 25, and through the transparent disk 23 and cylinder 19 where necessary, toward the screen 28. The top edge of cylinder 19 represents the horizon, and is adjusted to to simulate altitude. Thus, the images of the terrain features 24 and 25 are projected upon the screen 28 and can be viewed by the observer 29. When the aircraft the observer is supposed to be in simulates a vertical takeoff from its parked position, the lead screws 15 are operated to slowly lower the assembly so that the images of the terrain features 24 and 25 seem to drop. However, the horizon cylinder is maintained at its height for the moment. At the same time, as the attitude of the aircraft changes, the support 16 operates to cause the hemisphere 18 to rotate so that the disk 23 moves in the opposite direction from the simulated pitch. Assuming that the aircraft the observer 29 is in tends to pitch upward as it rises, the disk 23 will lower and the hemisphere 18 will be rotated so that the disk 23 rotates slightly clockwise as shown. The horizon is elevated independently, but is tilted simultaneously.

This creates the impression in the observer that he is rising above the utility poles 25 and the trees 24 and is pitching upward slightly. At the same time, the aircraft may begin to move across the terrain. The disk 23 is then rotated by the motor 21 to create the impression that the aircraft is moving over the ground in the opposite direction, and the base 11 moves across the surface 13 so that the effect on the screen is of the terrain features 24 and 25 passing by a moving aircraft. Once the simulated aircraft rises above a prescribed altitude, the terrain features fade away and disappear from the screen, leaving only the horizon in view and the impression is created that the aircraft is flying too high to see recognizable ground features.

The point light source is shown in greater detail in FIG. 2 wherein the equivalent of the disk 23 is shown at 39 as the top surface of a closed cylinder 38, both of suitable transparent construction material such as glass or an acrylic resin. A model of a single terrain feature is shown as a bare tree 24. The light source comprises a gas tube such as a small mercury arc lamp 31 which is mounted in the focus of a small spherical mirror 32. The second spherical mirror 33 is arranged to reflect the light from the lamp 31 onto one end 37 of a light pipe 34 which has a right angle bend including a reflective 45° surface 36. The light emerges from the light pipe 34 at the other end 36 in a 90° cone. Both ends 36 and 37 of the light pipe 34 are formed as negative lenses.

Light from the lamp 31 is reflected from the mirror 33 onto the negative lens 37. Light emerging from the other side of the lamp 31 is reflected from the mirror 32 onto the mirror 33 and from there to the negative lens 37. The negative lens 37 in the receiving end of the light pipe 34 causes the light entering it to become more parallel to the longitudinal axis of the pipe 34, reducing the number of internal reflections or bounces. This reduces the loss of light and provides more light at the end 36. The end 36 is formed as a negative lens to limit the projection of the light from the end of the pipe 34 to a 90° cone. If desired, this light pipe 34 may be replaced with one of the light pipes shown in U.S. Pat. No. 3,439,157 to Walter E. Myles, issued on Apr. 15, 1969, and entitled Point Light Source. The light from the source 31 is projected in a well defined pattern to illuminate the terrain features 24. Although no support means have been shown for the light source 36, any suitable means including gimbals may be used. Preferably, the light pipe 34 may be surrounded with a collision switch device to trigger a switch and shut off the power should the platform 39 move to such an extent that a collision with the pipe 34 is imminent. In such a case, the switch would shut off power to both the lamp and the equipment for moving the platform 39. Such devices are well known and none has been shown to avoid too much clutter on the drawings.

The above specification has illustrated and described a new and improved visual system which has particular utility in simulating the environment surrounding rotary-wing aircraft takeoffs and landings. The apparatus shown and described is effective, simple, rugged, and inexpensive. It is realized that this description may indicate to others additional ways in which the principles of this invention may be used by those in the art without departing from its spirit. It is, therefore, intended that this invention be limited only by the scope of the appended claims.

What is claimed is:

1. A simplified visual system for simulating an environment, said system comprising a base controllably movable over a stationary surface, a platform mounted on said base, first means for selectively causing said platform to move vertically, second means for causing said platform to rotate, third means for causing said platform to pitch and yaw, a generally transparent cylinder surrounding said platform with its longitudinal axis vertical and its upper edge defining a horizon, models of environmental features mounted on said platform within said cylinder, a projection screen without said cylinder, and a light source mounted generally in line with said horizon and within said cylinder to project images of said environmental models onto said screen.

2. The system defined in claim 1 wherein said horizon defining transparent cylinder surrounds said platform with its upper edge in line with said light source so that the images of said environmental features may be projected through said cylinder onto said screen.

3. The system defined in claim 2 wherein said cylinder is arranged to be selectively fixed with respect to said light source.

4. The system defined in claim 2 wherein said cylinder is arranged selectively to be fixed with respect to vertical movement of said platform so the horizon which is projected onto said screen may remain fixed even though said platform moves vertically.

5. The system defined in claim 2 wherein said motion means comprises at least first means to cause said platform selectively to move vertically, second means to cause said platform selectively to move in pitch and yaw, and third means to cause said platform selectively to rotate.

6. The system defined in claim 2 wherein said light source comprises a point source of light, and means for limiting the geometrical distribution of light from said source.

7. The system defined in claim 6 wherein said point source of light includes a light generator, a light pipe and means for directing the light from the light generator to said light pipe.

8. The system defined in claim 2 wherein said platform is formed of a transparent material so that images of said environmental features can be projected therethrough.

9. The system defined in claim 2 wherein said environmental features comprise essentially outline models in three dimensions of said features.

* * * * *